(12) United States Patent
Rabb et al.

(10) Patent No.: US 10,794,606 B2
(45) Date of Patent: Oct. 6, 2020

(54) SYSTEMS AND METHODS OF DETECTION WITH ACTIVE INFRARED SENSORS

(71) Applicant: Google LLC, Mountain View, CA (US)

(72) Inventors: Laura Rabb, San Jose, CA (US); Andrea Colaco, Mountain View, CA (US); Ghulam A. Kirmani, Mountain View, CA (US); Aveek Ravishekhar Purohit, Mountain View, CA (US); Luis Villaran, East Palo Alto, CA (US); Kenneth Louis Herman, San Jose, CA (US); Bryan James, Menlo Park, CA (US); Casey Mills Davis, Palo Alto, CA (US); Yash Modi, San Mateo, CA (US)

(73) Assignee: Google LLC, Mountain View, CA (US)

( * ) Notice: Subject to any disclaimer, the term of this patent is extended or adjusted under 35 U.S.C. 154(b) by 248 days.

(21) Appl. No.: 15/806,985

(22) Filed: Nov. 8, 2017

(65) Prior Publication Data

US 2018/0066861 A1  Mar. 8, 2018

Related U.S. Application Data

(63) Continuation of application No. 14/717,302, filed on May 20, 2015, now Pat. No. 9,841,205.

(51) Int. Cl.
*F24F 11/30* (2018.01)
*G08B 13/187* (2006.01)
(Continued)

(52) U.S. Cl.
CPC .............. *F24F 11/30* (2018.01); *F24F 11/62* (2018.01); *G01S 17/04* (2020.01); *G01S 17/89* (2013.01);
(Continued)

(58) Field of Classification Search
CPC .......... F24F 11/006; F24F 11/30; F24F 11/62; G01S 17/026; G01S 17/89; G05B 15/02; G08B 13/19
(Continued)

(56) References Cited

U.S. PATENT DOCUMENTS 4,784,319 A   11/1988  Kaiser
5,326,028 A   7/1994   Kano et al.
(Continued)

FOREIGN PATENT DOCUMENTS

WO   WO-2009058127 A1   5/2009

OTHER PUBLICATIONS

Extended European Search Report dated Oct. 10, 2016 as received in Application No. 16170170.1.

*Primary Examiner* — David P Porta
*Assistant Examiner* — Abra S Fein
(74) *Attorney, Agent, or Firm* — Butzel Long

(57) ABSTRACT

Systems and methods of using active infrared (AIR) sensors to map a room of a home or building and determine whether an external portal (e.g., window and/or door) of the room is open or closed are provided. In particular, the systems and methods include outputting infrared (IR) light from an IR light source of an active infrared (AIR) sensor, receiving reflected IR light with a light sensor, and determining, with a processor coupled to the light sensor, whether a window of a room is open according to the received reflected IR light.

18 Claims, 7 Drawing Sheets

(51) Int. Cl.
*F24F 11/62* (2018.01)
*G01S 17/04* (2020.01)
*G01S 17/89* (2020.01)
*G05B 15/02* (2006.01)
*G08B 21/18* (2006.01)
*G08B 13/08* (2006.01)
*G08B 13/183* (2006.01)
*F24F 11/46* (2018.01)

(52) U.S. Cl.
CPC ........... *G05B 15/02* (2013.01); *G08B 13/187* (2013.01); *G08B 21/18* (2013.01); *F24F 11/46* (2018.01); *G08B 13/08* (2013.01); *G08B 13/183* (2013.01)

(58) Field of Classification Search
USPC ..................................................... 250/338.1
See application file for complete search history.

(56) References Cited

U.S. PATENT DOCUMENTS

| | | |
|---|---|---|
| 6,840,052 B2 | 1/2005 | Smith et al. |
| 8,136,738 B1 | 3/2012 | Kopp |
| 8,849,487 B2 | 9/2014 | Malone et al. |
| 2002/0067259 A1 | 6/2002 | Fufidio et al. |
| 2007/0146132 A1 | 6/2007 | Krug et al. |
| 2010/0236770 A1 | 9/2010 | Pursifull |
| 2012/0127317 A1 | 5/2012 | Yantek et al. |
| 2012/0259468 A1 | 10/2012 | Donaldson et al. |
| 2014/0251987 A1* | 9/2014 | Reay ....................... F24C 7/088 219/756 |
| 2014/0315570 A1* | 10/2014 | Yun ..................... H04W 64/003 455/456.1 |
| 2014/0365017 A1 | 12/2014 | Hanna et al. |

\* cited by examiner

SYSTEMS AND METHODS OF DETECTION WITH ACTIVE INFRARED SENSORS

BACKGROUND

Presently, operations of a heating, ventilating, and air conditioning (HVAC) systems for a home or building can be controlled by a controller, such as a programmable thermostat. More recently, the operation of some HVAC systems can be controlled remotely, such that a user does not have to be present in the home or building to control the operation of the HVAC system. Despite being controllable remotely, current HVAC systems are prone to wasting energy.

BRIEF SUMMARY

Implementations of the disclosed subject matter are directed towards smart home environments that include active infrared (AIR) sensors to generate three-dimensional (3D) maps of rooms of the home or building to determine locations of external portals (e.g., windows and exterior-opening doors, which are doors open to an exterior of the home or building, rather than to another room or other location of the home or building). The smart home system may include an HVAC system that may be controllable either directly (e.g., via a control panel, input device, or the like) or remotely (e.g., via a computing device such as a smart phone, smart watch, wearable computing device, tablet computer, personal or laptop computer, or the like). The smart home environment may determine, using the generated 3D map, whether the exterior portal (e.g., exterior-opening doors and/or windows) is open, and inform a user when the user attempt to control the operation of the HVAC system. That is, the AIR sensors may transmit infrared (IR) signals to determine whether the mapped exterior portals (e.g., doors and/or windows) of the room are open, and inform the user accordingly, so that energy to heat or cool the house is not wasted when the user controls the operation of the HVAC system of the smart home environment when an exterior portal (e.g., a door or window) is open.

According to an implementation of the disclosed subject matter, a method includes outputting infrared (IR) light from an IR light source of an active infrared (AIR) sensor, receiving reflected IR light with a light sensor, and determining, with a processor coupled to the light sensor, whether an exterior portal (e.g., a window or external door) of a room is open according to the received reflected IR light.

According to an implementation of the disclosed subject matter, a system includes an IR light source of an active infrared (AIR) sensor to output infrared (IR) light, a light sensor to receive reflected IR light, and a processor, coupled to the light sensor, to determine whether an exterior portal (e.g., a window or external door) of a room is open according to the received reflected IR light.

According to an embodiment of the disclosed subject matter, means for determining whether a exterior portal is open are provided, including outputting infrared (IR) light from an IR light source of an active infrared (AIR) sensor, receiving reflected IR light with a light sensor, and determining, with a processor coupled to the light sensor, whether the exterior portal (e.g., a window or an external door) of a room is open according to the received reflected IR light.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
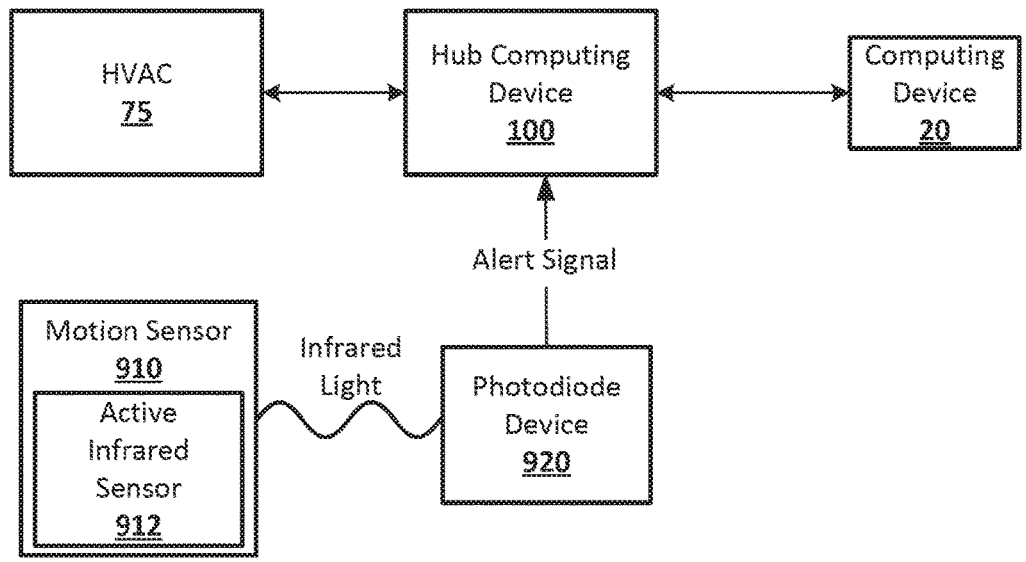
FIG. 1 shows an example arrangement suitable for an infrared system with an external infrared sensor according to an implementation of the disclosed subject matter.

Implementations of the smart home environment of the disclosed subject matter include active infrared (AIR) sensors to generate three-dimensional (3D) maps of one or more rooms of a home or building. The AIR sensors and 3D mapping determine locations of exterior portals (e.g., windows and exterior-opening doors, where the doors open to an exterior of the home or building, rather than to another room or other location of the home or building). In some implementations, user input may be used to confirm whether the mapped portals are interior doors (e.g., doors that open to other rooms within the house) or exterior doors (e.g., doors that open to an area outside the house).

The smart home environment may include an HVAC system that may be controllable by a mounted input device (e.g., via a control panel, input device, or the like) and/or a computing device remotely (e.g., via a computing device such as a smart phone, smart watch, wearable computing device, tablet computer, personal or laptop computer, or the like). The remote connection may be via a wired and/or wireless network. The network may include the smart home network. The smart home environment may determine, using the generated 3D map, whether exterior portals (e.g., exterior-opening doors and/or windows) are open, and inform a user when the user attempt to control the operation of the HVAC system.

A notification may be provided from, for example, a hub computing device of the smart home environment to a computing device. The AIR sensors of the smart home environment may transmit infrared (IR) signals to determine whether the mapped exterior portals (e.g., doors and/or windows) of the room are open, and inform the user accordingly (e.g., via, so that energy to heat or cool the house is not wasted when the user controls the operation of the HVAC system of the smart home environment when an exterior portal (e.g., a door or window) is open.

As disclosed herein, an external portal may be a window, a door, or any other suitable point of entry into a room. The term external portal may be used interchangeably with window and/or door throughout the disclosure.

According to implementations disclosed herein, an infrared system with an external infrared sensor may allow for objects or areas to be monitored, and for notifications to be transmitted and components of the smart home environment to be controlled according to the monitoring. A motion sensor with an active infrared sensor may include light emitting diodes (LEDs) that emit infrared light. A photodiode device may be placed in an area visible to the motion sensor, with the photodiode pointed towards an LED of the motion sensor. The photodiode device may be connected to the motion sensor, or the smart home environment, using any suitable wired or wireless connection. The photodiode device may detect a level of infrared light being emitted by the active infrared sensor, from the LED, and may report the detected infrared light level to the motion sensor or the smart home environment. When the detected infrared light level drops, this may indicate that an object and/or person has moved between the photodiode and the motion sensor, and/or that a window or door in the room where the AIR sensor is located has been opened.

The detection of a drop in the infrared light level detected by the photodiode may be used to trigger an alert, alarm, and/or notification in the security system of the smart home environment indicating that a door and/or window has been opened, and/or that a person has entered a restricted area. A photodiode device may also be placed near a window, door, and/or other object, with the photodiode directed toward the window, door, and/or object. The photodiode may detect a level of infrared light being reflected off the window, door, and/or object from the active infrared sensor. When the detected infrared light level changes, either increasing or decreasing, this may indicate that the window and/or door has opened, and/or that the object has been moved, as the manner in which infrared light reflects off the window, door, and/or object has changed.

A notification may be sent to a user's computing device (e.g., smartphone, smart watch, tablet computer, or the like) regarding the detected opening of the door and/or window, and the user may select to adjust the HVAC system according to the detected opening (e.g., to minimize using energy to heat and/or cool the room). In some implementations, the smart home system may automatically adjust the HVAC system so as to minimize energy usage according to the determination of whether a window and/or exterior door is open. In some implementations, the detection of a drop in the detected infrared light level by the photodiode may be used to trigger an alert and/or alarm in a smart home environment indicating that the object has been moved.

In some implementations, a motion sensor may be used to detect motion within a room as part of a smart home environment. The motion sensor may use, for example, an active infrared sensor for motion detection. The active infrared sensor can include an LED for emitting infrared light and an infrared camera for capturing light in the infrared part of the light spectrum, and may report the motion of objects within its field of view as the motion of a person within a room. The motion sensor may trip, i.e., detect a motion, and send an alert in response. When a security system in the smart home environment is in an armed state, the alert from the motion sensor may be cause for sending out an alert, sounding an alarm, and notifying occupants of the environment or authorities of an intruder, as the room with the motion sensor should be empty.

A photodiode device may be a sensor device used in the smart home environment that may include a photodiode for monitoring levels of infrared light. The photodiode device may also connect, wired or wirelessly, to a motion sensor or other component of the smart home environment, to report detected infrared light levels.

In some implementations, a motion sensor with an active infrared sensor and a photodiode device may be used to set up an infrared trip wire. For example, a person may wish to know when someone has entered a specific part of a room. The motion sensor may be positioned at one end of the entrance to that part of the room, and the photodiode device may be positioned at the other end, with the photodiode pointed towards the LED of the active infrared sensor on the motion sensor. Infrared light emitted by the LED of the active infrared sensor may be detected by the photodiode device at a certain level when there are no obstructions between the motion sensor and photodiode device. The level of infrared light detected in the initial configuration, and/or in the absence of any obstruction, may be referred to as a base level. When an object, such as a person, comes in between the motion sensor and the photodiode device, the photodiode device may detect an infrared light level lower than the base level, as the object may block the infrared light. The photodiode device, motion sensor, or hub computing device may detect the drop in the detected infrared light level at the photodiode, which may result in the hub computing device determining that the infrared trip wire between the motion sensor and the photodiode device has been tripped. The hub computing device may respond accordingly, for example, by generating a notification to an occupant of the smart home environment indicating that the infrared trip wire was tripped, sounding an alert or alarm, or notifying any other appropriate party.

A motion sensor and a photodiode device may also be used to monitor a door, a window, and/or an object. For example, a user may wish to know when a door and/or window of a room is open, so that an HVAC system may be adjusted so that energy is not wasted in the heating or cooling of a building or home. The user may also wish to know whether a window and/or door is opened to determine whether there is an intrusion to the home or building. In another example, person may wish to know when an object, for example, an item of electronics, artwork, or some other valuable, which is out in the open, has been moved.

The AIR sensor and the photodiode device may be used to generate a three-dimensional (3D) map of a room. The LEDs of the AIR sensor may be used to scan the room to determine features, such as doors, windows, furniture, and other objects. The LEDs may emit IR light, and the reflected IR light from features in the room (e.g., doors, windows, walls, ceiling, floor, furniture, objects, and the like) may be detected by the photodiode device. From the received reflected IR light, the smart home environment may generate a 3D map of a room, including its features. With the 3D map, the AIR sensors and the photodiode device may determine whether a door and/or window has been opened, and/or whether an object has been moved.

The motion sensor may be placed in the room with the door, window, and/or object. The photodiode device may be placed near the object, with the photodiode pointed toward the object, and not pointed directly at the LED of the active infrared sensor on the motion sensor. Infrared light emitted by the LED of the active infrared sensor may reflect off of the object and be detected by the photodiode device at a certain level when the object is in an initial position. This level may be a base level. For example, when a door or window is opened, the photodiode device may detect an infrared light level may vary from the base level and/or change characteristics, as the amount of infrared light reflected off the window and/or door to the photodiode device may change with movement of the object.

When the object is moved, for example, someone attempts to pick the object up, the photodiode device may detect an infrared light level that varies from the base level, as the amount of infrared light reflected off the object to the photodiode device may change with movement of the object.

The photodiode device, motion sensor, and/or hub computing device may note the change in the detected infrared light level at the photodiode, which may result in the hub computing device determining that the window and/or door is opened, and/or an object is being moved. The hub computing device may respond accordingly. For example, the hub computing device may transmit a notification to a user's computing device (e.g., smartphone, smartwatch, tablet computer, or the like) that a window and/or door is open, and/or may adjust the HVAC system so as to not waste energy heating or cooling the home or building, as a window and/or door is detected to be open (e.g., automatically or according to a user's input). In some implementations, when a door and/or window is determined to be open, the hub computing device may activate an alarm, and/or notify law enforcement, a security firm, or the like. The hub computing device may generate a notification to a user of the smart home environment indicating that the object is being moved, sounding an alert or alarm, or notifying any other appropriate party.

Figure 8:
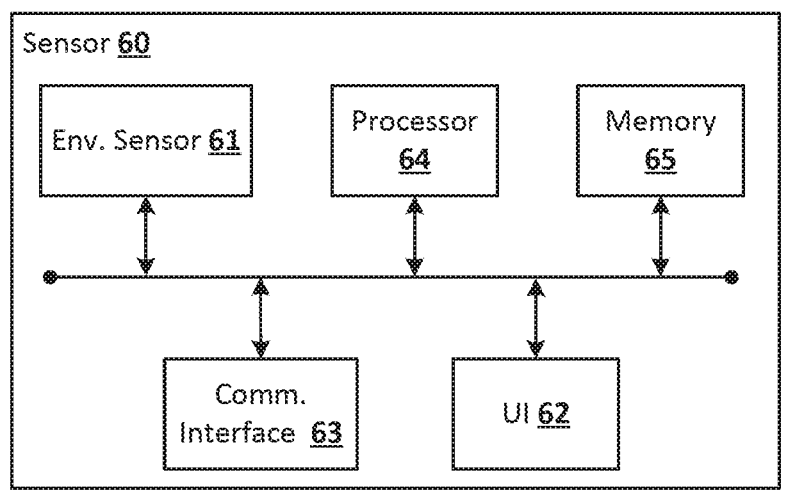
FIG. 8 shows an example sensor according to an implementation of the disclosed subject matter.

FIG. 1 shows an example implementation of an infrared system of a smart home environment (e.g., as discussed below in connection with FIGS. 8-10). The infrared system may include a motion sensor 910 having and AIR sensor 912, a photodiode 920, and a hub computing device 100, a computing device 20, and an HVAC system 75, which may be communicatively connected via a wired and/or wireless network (e.g., network 70 shown in FIG. 9).

The hub computing device 100 may be a personal computer, laptop computer, server, smartphone, smart watch, wearable computing device, tablet computer, controller, or the like. The hub computing device may communicate with and/or control the HVAC 75, photodiode device 920, motion sensor 910, and/or computing device 20.

The HVAC 75 may be any heating, ventilating, and air conditioning system to adjust a temperature of a room, building, or home. Temperature may be adjusted by the hub computing device 100 and/or the computing device 20. As discussed below in connection with FIGS. 9 and 11, computing device 20 may be smartphone, smart watch, wearable computing device, tablet computer, personal computer, laptop computer, key FOB, or the like.

The motion sensor 910 may include an active infrared (AIR) sensor 912. The AIR sensor 912 may include a source of infrared light, such as an LED, which may actively emit infrared light into the area around the motion sensor 910. The AIR sensor 912 may include a camera capable of recording images from the emitted infrared light reflecting off of objects, allowing the camera to view a room that has no light source visible to the human eye. A photodiode device 920 may be a device that includes any suitable photodiode and/or light sensor for detecting infrared light, and may act as an external infrared sensor. The photodiode device 920 may be connected, using any suitable wired or wireless connection, to the motion sensor 920, or to the hub computing device 100 of the smart home environment.

As discussed above, the AIR sensor 912 and/or the photodiode device 920 may be controlled by the hub computing device 100 so as to generate a 3D map of a room in which the AIR sensor 912 and the photodiode device 920 are disposed. The AIR sensor may output IR light, and the reflected IR light received by the AIR sensor 912 and/or photodiode device 920 may be used to determine the features of the room. The hub computing device 100 may determine, according to the received reflected IR light, a feature or particular features of a room, such as the location of a door or window. For example, the hub computing device 100 may compare the reflected IR light with the pre-stored data to determine whether the reflected IR light is a particular feature (e.g., a window, a door, furniture, or the like). The 3D map may include features such as the location of doors, windows, furniture, and other objects within the room.

In determining the features of the room, the hub computing device 100 may distinguish features such as a door from a wall by detecting the frame of the door according to the reflected IR light and/or a camera image from the AIR sensor 912. For example, as a frame of the door may extend from a wall surface, the reflected IR light may be used to determine the difference between the wall and the door frame. In another example, the hub computing device 100 may determine a feature, such as a window, according to the reflected IR light from the glass of the window, and/or from the frame of the window (e.g., which may be recessed from a wall of the room or may extend from the wall of the room).

For example, the hub computing device 100 may control the AIR sensor 912 to output IR light in a particular direction and/or scan IR light in a particular area of the room. The reflected light received by the AIR sensor 912 and/or the photodiode device may be stored, and the stored data may be used by the computing device 100 to form a 3D map of the portion of the room where IR light was output by the AIR sensor 912, and/or an area where IR light was scanned. The hub computing device 100 may compare the reflected IR light with pre-stored data to determine whether the reflected IR light is a particular feature and/or a portion of a feature (e.g., a window, a door, furniture, or the like). If a feature (e.g., at least a portion of a wall, door, window, object, or the like) is determined according to the reflected IR light, it may be represented in the 3D map. Once an area and/or region of the room is mapped, the hub computing device 100 may control the AIR sensor 912 to output and/or scan light in another area of the room (e.g., an unmapped portion of the room). As previously discussed, the hub computing device 100 may determine features, represent them in the 3D map, and then scan and/or radiate IR light in another area of the room. That is, the IR illumination and/or scanning of the room to form the 3D map may continue until the room is mapped in its entirety. For example, the hub computing device 100 may determine that the 3D map of the room is complete when portions of pre-mapped features are detected by the AIR sensor 912 and/or the photodiode device 925.

When the 3D map has been generated by the hub computing device 100, the AIR sensor 912 and/or the photodiode may be used to determine whether a door (e.g., an exterior door) and/or window have been opened according to the reflected IR light. That is, the AIR sensor 912 may emit IR light (e.g., periodically, at predetermined intervals of time), the detection of which may be used to determine whether a door and/or window in the room has been opened.

When the hub computing device 100 determines that a window and/or door is open, the hub computing device 100 may control the HVAC 75 so that energy is not wasted in cooling or heating. Alternatively, or in addition, the hub computing device 100 may transmit a notification to, for example, the computing device 20 that a door or window is open, and the location of the door or window. A user, via the computing device 20, may control the HVAC system 75 so as to not waste energy when the window or door is open.

In some implementations, the arrangement of the motion sensor 910 and the photodiode 920 may be arranged so as to serve as an optical tripwire. That is, the motion sensor 910 may be placed in a room along with the photodiode device 920. The photodiode device 920 may be oriented so that the photodiode points towards the source of infrared light, such as an LED, on the motion sensor 910. This may create an infrared trip wire between the photodiode device 920 and the motion sensor 910. For example, the photodiode device 920 may detect the level of infrared light being received from the AIR sensor 912 when the motion sensor 910 and the photodiode device 920 are initially set up. This level may be a base level for the photodiode device 920. If an object moves in between the photodiode device 920 and the motion sensor 910, the infrared light from the AIR sensor 912 may be blocked, resulting in the photodiode 920 detecting a lower light infrared light level than the base level. This may indicate that someone has crossed between the motion sensor 910 and the photodiode device 912, tripping the infrared trip wire. The photodiode device 920 may send a signal to the hub computing device 100, either directly or through the motion sensor 910, indicating the infrared tripwire has been tripped. The hub computing device may send an alert, sound an alarm, or send a notification, for example, to an occupant of the environment on the computing device 20, indicating the tripping of the infrared trip wire.

Figure 2:
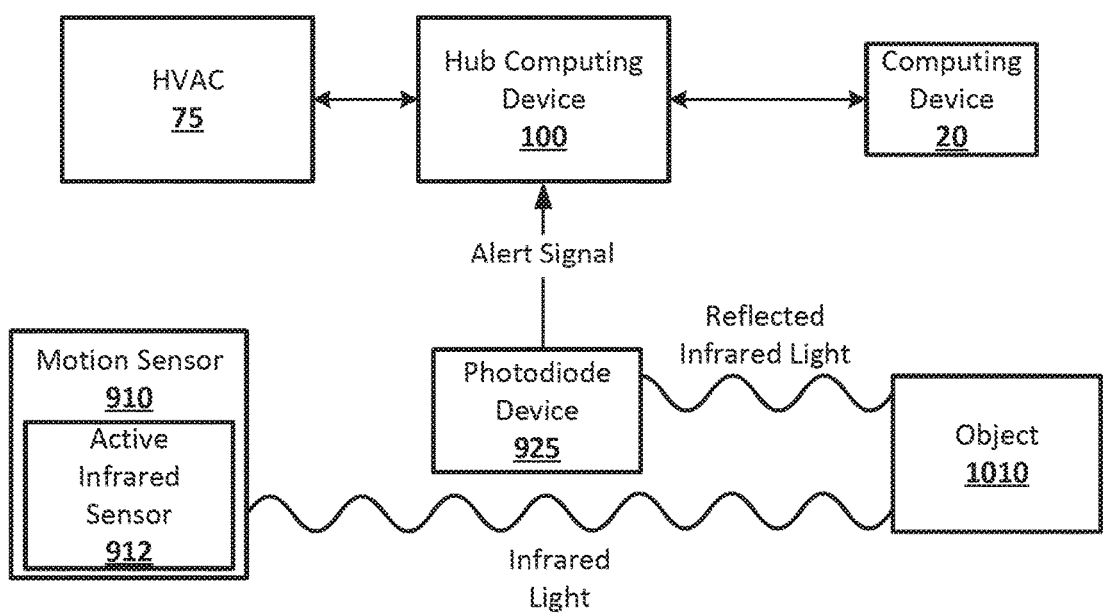
FIG. 2 shows an example arrangement suitable for an infrared system with an external infrared sensor according to an implementation of the disclosed subject matter.

FIG. 2 shows an example arrangement suitable for an infrared system of a smart home environment with an external infrared sensor according to an implementation of the disclosed subject matter. The photodiode device 925 may be placed near an object 1010. In some implementations, the object 1010 may be a door, a window, furniture, or an object of value to a user. The photodiode device 925 may be oriented with a photodiode pointed towards the object 1010, and away from the AIR sensor 912, so that the photodiode does not pick up infrared emitted directly from the AIR sensor 912. When the photodiode device 925 is initially set up, it may detect level of infrared light being reflected off of the object 1010 and arriving at the photodiode. This may be the base level for the photodiode device 925. If the position of object 1010 changes, such as when a door or window is opened and/or the object 1010 is moved, this may change the level of infrared light arriving at the photodiode after being reflected off the object 1010.

The level may increase, for example, if the arrangement and/or movement of the object 1010 results in a more reflective surface of the object 1010 reflecting the infrared light from the AIR sensor 912 towards the photodiode device 925. For example, when the object 1010 is a window, the window may be more reflective when it is in a closed position, and may be less reflective as the amount that the window opens increases. In another example, the level may decrease if the movement results in less reflective surface of the object 1010 reflecting the infrared light towards the photodiode device 925, or if the object 1010 is removed from its previous position so that it no longer reflects infrared light toward the photodiode device 925. The photodiode device 925 may detect the change in the level of reflected infrared light from the base level, which may indicate that someone is attempting to change the position (e.g., open a door or window) and/or move the object 1010. The photodiode device 925 may send a signal to the hub computing device 100, either directly or through the motion sensor 910, indicating the object 1010 is being moved. The hub computing device 100 may send an alert, sound an alarm, or send a notification, for example, to an occupant of the environment on the computing device 20, indicating that the object 1010 is being moved.

Figure 3:
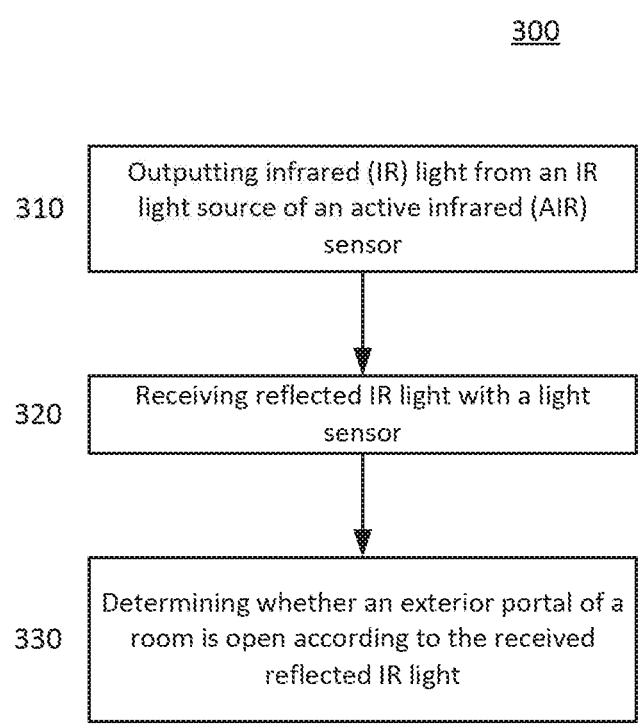
FIG. 3 shows an example process suitable for an infrared system according to an implementation of the disclosed subject matter.

FIG. 3 shows an example process 300 suitable for an infrared system according to an implementation of the disclosed subject matter. In operation 310, IR light may be output from an IR light source of the AIR sensor 912. The IR light source may scan an IR beam in a particular location of the room (e.g., an area where a window and/or door is located). Alternatively, the IR light source may emit IR light into the room where the AIR sensor 912 is disposed. At operation 320, reflected IR light may be received by a sensor, such as the AIR sensor 912 itself, or the photodiode device 920 and/or photodiode device 925. At operation 330, the photodiode device 920 and/or 925, and/or the hub computing device 100 may determine whether an external portal (e.g., a window and/or an exterior door) is open according to the received reflected light. For example, the reflection of the IR light from glass of a closed window may be received, and the hub computing device 100 may determine that the window is closed. In another example, reflected IR light from the window may be less than when it is closed, and thus the hub computing device 100 may determine that the window is open.

The hub computing device 100 may correlate the received IR light with a 3D map of the room that may previously be generated by the AIR sensors of the smart home environment. That is, the reflected IR light may be used to determine whether a window and/or door is open according to the reflected IR light and the 3D map. For example, if the 3D map of the room includes a window, but the reflected IR light does not include a signature response from IR light on glass, the hub computing device may determine that the window is in an open position. For example, the hub computing device 100 may be calibrated so as determine when the reflected IR light is from a reflection from a glass surface (e.g., such as a window). Once calibrated, the hub computing device may compare any reflected IR light with the stored signature characteristic of an IR light reflection from a glass surface. Similarly, the hub computing device 100 may be calibrated to detect a frame around a door or a window, which may extend from or be recessed from a wall of a room. That is, the hub computing device may compare reflected IR light with the stored signature characteristic of an IR light reflection from a door and/or window frame.

In another example, if the 3D map of the room includes an exterior door (i.e., a door opening outside the home or building), a portion of the IR light may not be reflected by the door, thus indicating that the door (e.g., as part of the 3D map of the room) may be in an open position.

When a door and/or window is determined to be open by the hub computing device 100, a notification may be transmitted to the computing device 20. The notification may inform a user of the open window and/or door, and the location in the home or building of the door and/or window. The notification may include at least one option of the user to adjust the HVAC system 75, so as to not waste energy heating and/or cooling when the window is open.

According to the received reflected IR light, the hub computing device may determine that a security event has occurred. For example, the reflected IR light from the glass of the window may indicate that the glass of the window is broken (e.g., as there may not be uniform reflectivity across the pane of glass of the window). A notification may be transmitted to the computing device 20 from the hub computing device 100 that the window is broken. Alternatively, or in addition, the hub computing device 100 may control an alarm device (not shown) which may output an audio and/or visual alarm so as to alert the occupants of the home or building that there is a security event related to the broken glass of the window. In some implementations, other sensors of the smart home environment (as discussed below in connection with FIGS. 8-10) may be used to confirm that the broken window is a security event (e.g., an unlawful entry), rather than an accident (e.g., a ball or other object from children playing in the room may have broken the glass unintentionally).

Figure 4:
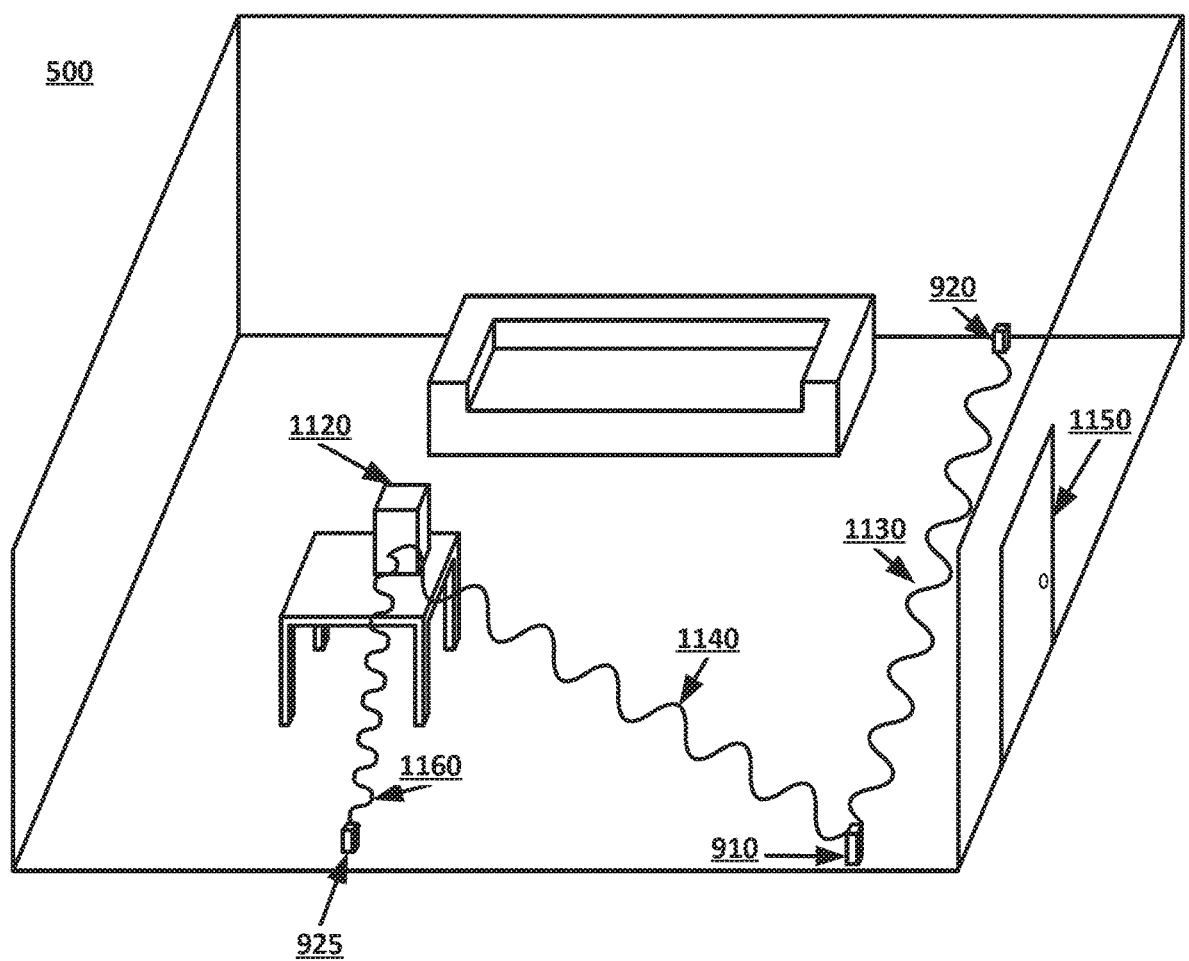
FIG. 4 shows an example environment suitable for an infrared system with an external infrared sensor according to an implementation of the disclosed subject matter.

FIG. 4 shows an example environment suitable for an infrared system with an external infrared sensor according to an implementation of the disclosed subject matter. The motion sensor 910, including the AIR sensor 912, may be set up in the room 500 along with the photodiode device 920. The motion sensor 910 may be placed near a wall of the room 500, and the photodiode device 920 may be placed near the opposite wall such that a straight line between the motion sensor 910 and photodiode device 920 runs parallel to the wall of the room 500 with the entryway 1150. The photodiode device 920 may have a photodiode oriented towards the motion sensor 910. Infrared light 1130, emitted by the AIR sensor 912 of the motion sensor 910, may create an infrared tripwire between the motion sensor 910 and the photodiode device 920 based on the level of infrared light detected by the photodiode device 920. When there are no obstructions between the motion sensor 910 and the photodiode device 920, the photodiode device 920 may detect a base level of the infrared light 1130. When something comes in between the motion sensor 910 and the photodiode device 920, for example, a person enters the room 500 through the entryway 1150 and walks towards the back wall, passing in between the motion sensor 910 and the photodiode device 920, the photodiode device 920 may detect a drop in the level of the infrared light 1130 from the base level. This may result in the photodiode device 920 signaling, for example, to the hub computing device 100, that the infrared trip wire has been tripped.

A photodiode device 925 may also be placed in the room 500, near an object 1120. Infrared light 1140 from the AIR sensor 912 of the motion sensor 910 may reflect off the object 1120, resulting in a base level of reflected infrared light 1160 being detected by the photodiode of the photodiode device 925. When the object 1120 is moved, for example, picked up or reoriented, the level of the reflected infrared light 1160 detected by the photodiode device 925 may change, either increasing or decreasing from the base level. The photodiode device 925 may detect the change in the level of the reflected infrared light 1160. This may result in the photodiode device 925 signaling, for example, to the hub computing device 100, that the object has moved.

Figure 5:
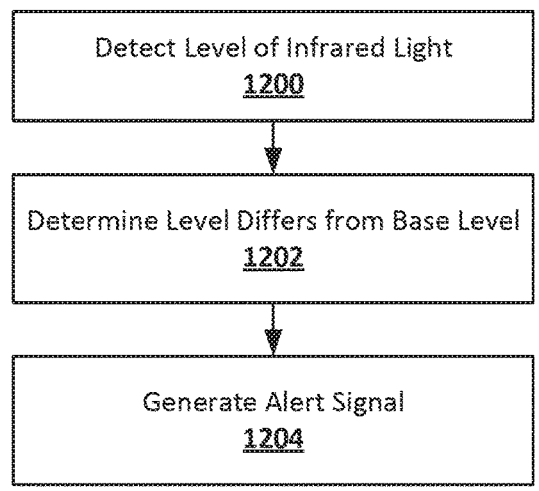
FIG. 5 shows an example process suitable for an infrared system with an external infrared sensor according to an implementation of the disclosed subject matter.

FIG. 5 shows an example process suitable for an infrared system with an external infrared sensor according to an implementation of the disclosed subject matter. At operation 1200, a level of infrared light may be detected. For example, the photodiode device 920 may detect the level of the infrared light 1130 received from the AIR sensor 912 of the motion sensor 210, or the photodiode device 925 may detect the level of reflected infrared light 1160 from the infrared light 1140 emitted by the AIR sensor 912 and reflecting off of the object 1010.

At operation 1202, it may be determined that the level differs from the base level. For example, the photodiode sensor 920 may determine that the level of the infrared light 1130 detected from the motion sensor 910 is lower than a base level of the infrared light 1130 that was detected when the photodiode device 920 was initially set up, or the photodiode device 925 may determine that the level of the reflected infrared light 1160 differs from a base level of the reflected infrared light 1160 that was detected when the photodiode device 920 was set up.

At operation 1204, an alert signal may be generated. For example, the photodiode device 920 may generate an alert signal indicating that the infrared trip wire has been tripped, and may send the alert signal to the hub computing device 100, or the photodiode device 925 may generate an alert signal indicating that the object 1010 is being moved, and may send the alert signal to the hub computing device 100.

Figure 6:
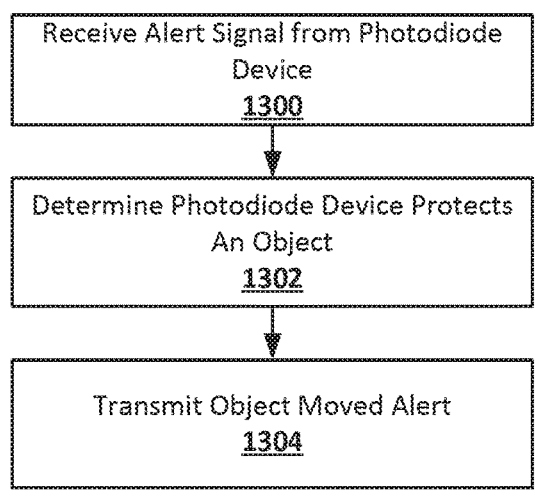
FIG. 6 shows an example process suitable for an infrared system with an external infrared sensor according to an implementation of the disclosed subject matter.

FIG. 6 shows an example process suitable for an infrared system with an external infrared sensor according to an implementation of the disclosed subject matter. At operation 1300, an alert signal may be received from a photodiode device. For example, the hub computing device 100 may receive, with, for example, the signal receiver 110, an alert signal from the photodiode device 925. The alert signal may be received directly from the photodiode device 925, or through the motion sensor 910.

At operation 1302, it may be determined that the photodiode device protects an object. For example, the hub computing device 100 may determine, based on an identification or known location of the photodiode device 925, that the photodiode device 925 is positioned to monitor and protect the object 1010. Alternatively or in addition, a user may indicate that a particular object, such as an object associated with a region of a 3D map as previously described, is an object to be protected by the system.

At operation 1304, an object moved alert may be transmitted. For example, the hub computing device 100 may transmit an alert that the object 1010 is being moved in any suitable manner. The alert may be a notification sent to the computing device 20, sounded over speakers in the smart home environment, or displayed on a screen connected to the smart home environment.

Figure 7:
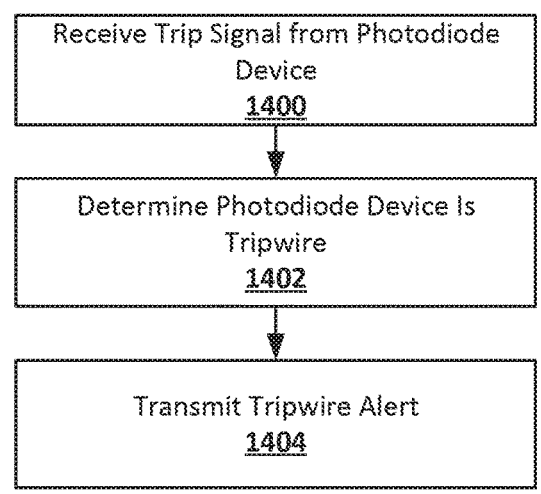
FIG. 7 shows an example process suitable for an infrared system with an external infrared sensor according to an implementation of the disclosed subject matter.

FIG. 7 shows an example process suitable for an infrared system with an external infrared sensor according to an implementation of the disclosed subject matter. At operation 1400, an alert signal may be received from a photodiode device. For example, the hub computing device 100 may receive, with, for example, the signal receiver 110, an alert signal from the photodiode device 920. The alert signal may be received directly from the photodiode device 920, or through the motion sensor 910.

At operation 1402, it may be determined that the photodiode device is part of an infrared tripwire. For example, the hub computing device 100 may determine, based on an identification or known location of the photodiode device 920, that the photodiode device 920 is positioned to create an infrared tripwire in conjunction with the motion sensor 910.

At operation 1404, a tripwire alert may be transmitted. For example, the hub computing device 100 may transmit an alert that infrared tripwire set up with the motion sensor 910 and the photodiode device has been tripped any suitable manner. The alert may be a notification sent to the computing device 20, sounded over speakers in the smart home environment, or displayed on a screen connected to the smart home environment.

Figure 9:
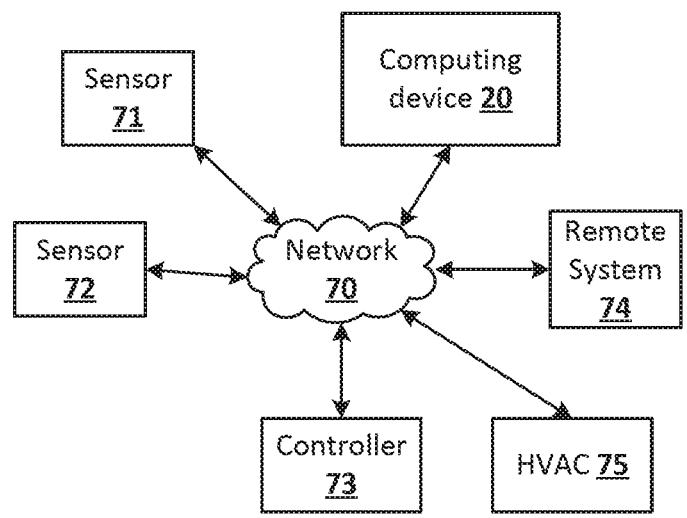
FIG. 9 shows a smart home environment according to an implementation of the disclosed subject matter.

In implementations of the disclosed subject matter, the AIR sensors 912 and the photodiode devices 920, 925 (e.g., as shown in FIGS. 1-2) may be used by the smart home system (e.g., as shown in FIG. 9) to detect and/or respond to other events. For example, the AIR sensor 912 may output infrared light to determine whether or not one or more persons are in a room with a television that is ON. The hub computing device 100 may communicate, via the network 100, with a television to determine whether it is ON. The AIR sensors 912 and the photodiode devices 920 and/or 925 may determine if one or more people are in the room. Alternatively, or in addition, the sensors 71, 72 (shown in FIG. 9 and described below) may be used to determine whether one or more persons are in the room with the television. If a predetermined period of time has elapsed, and no one is determined to be in the room with the television on, the AIR sensors 912 way transmit an IR light signal to turn off the television (e.g., to save energy). Other devices within the room that are ON may be turned off by the AIR sensors 912 and/or the hub computing device 100 when it is determined that one or more persons has not been within the room for a predetermined period of time. For example, lights, a ceiling fan, a fireplace, a music system (e.g., a stereo system), a media device (e.g., a game console, video and/or audio media player), and the like may be controlled by the AIR sensors 912 when it is determined (e.g., by the hub computing device 100) that one or more persons have not been detected within the room for a predetermined period of time (e.g., 10 minutes, 30 minutes, one hour, three hours, or the like).

In another implementation, the AIR sensors 912 and the photodiode device 920, 925 may determine a person approaching a door and/or window (e.g., from the outside). The detected approach of the person may be different from a typical approach pattern as stored by the hub computing device 100. When the detected approach to the door and/or window is different from the stored approach pattern, the hub computing device 100 may control the AIR sensor 912 to emit IR light in order to turn on a television, a music system, or the like. That is, in this implementation, a television and/or music system may be turned ON so as to deter an unauthorized entry of a person that is detected as approaching a door and/or window from the outside. In this implementation, the amount of energy used to keep the television and/or music system on to deter unwanted entry may be minimized.

The AIR sensors 912 and the photodiode devices 920, 925 (e.g., as shown in FIGS. 1-2) may be used by the smart home system (e.g., as shown in FIG. 9) to detect and/or respond to a person who has fallen and is not mobile. That is, a person may fall, and not be able to use a phone (e.g., a smartphone) to communicate the need for help. The person who has fallen may not be able to call for help using their voice, as no other persons may be in the home or building, and/or the person who has fallen may be unconscious. The AIR sensors 912 may be used to create a 3D map of the room (e.g., so as determine the contours and/or changes in height (if any) of a floor of a room), which may be compared to a previously-generated 3D map of the same room. The AIR sensors 912 may emit IR light to determine if a person has fallen (e.g., detect a person on the floor, who is not previously part of the generated 3D map). As the AIR sensors 912 may map the room, the map would include objects such as a bed or a couch, and the IR light reflected and captured by the photodiode device 920 and/or 925 may determine whether someone is merely on the couch or bed (e.g., for sleeping) or has fallen onto the floor and is immobile (e.g., the AIR sensors 912 and the photodiode devices 920 and/or 925 have not detected movement of the person from the location on the floor). When a person is detected by the hub computing device 100 as being fallen and immobile, the hub computing device 100 may transmit a notification to emergency service (e.g., ambulance, medical center, doctor, or the like) and/or to an emergency contact (e.g., doctor, relative, friend, or the like).

In the implementation described above, sensors (e.g., sensors 71, 72 as shown in FIG. 9) may include motion and/or vibration sensors, and/or accelerometers to determine whether a person has fallen such that there is an impact with the floor of the room (or other objects in the room). A camera (e.g., sensor 71, 72) may provide confirmation that a person has fallen and is immobile. That is, although it may not be desirable for the smart home environment to continually have a camera captured images from inside of the home or building, the hub computing device 100 may selectively control the camera (sensor 71, 72) to capture images from the room to determine and/or confirm that a person has fallen and is immobile. The sensors 71, 72 may include a microphone and/or intercom, so that an attempt to communicate with the fallen person may be made by a person who has received a notification (e.g., emergency contact, medical service worker, relative, friend, or the like). That is the sensors 71, 72 may include a microphone to detect sound and/or a voice of a person who has fallen, and/or may include a speaker to output the voice of a person who is remotely located who is attempting to contact the fallen person.

In another implementation, the AIR sensor 912 and the photodiode device 920 and/or 925 may determine whether a burner on a stove (e.g., a gas burner) has been left on and has been unattended for a predetermined period of time. That is, the AIR sensor 912 and the photodiode device 920 and/or 925 may determine that a flame is being emitted from a burner on a stove. The AIR sensor 912 and the photodiode device 920 and/or 925 may determine whether a person is in the same room as the burner emitting a flame. If the AIR sensor 912 and the photodiode device 920 and/or 925 detect that a person has not been in the room with the burner emitting the flame for a predetermined period of time (e.g., 10 seconds, 30 seconds, one minute, 5 minutes, or the like), the hub computing device may transmit a notification to the computing device 20 to notify a user. In some implementations, the hub computing device may control the stove so as to turn off the burner.

The infrared systems described above in connection with FIGS. 1-7 may be part of a smart home environment having sensors, as shown and described in connection with FIGS.

8-11. The smart home environment may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor can include, for example, a camera, a retinal camera, and/or a microphone.

A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is operating in an away mode, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

A sensor may include hardware in addition to the specific physical sensor that obtains information about the environment. FIG. 8 shows an example sensor of the smart home environment as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices.

A user interface (UI) 62 may provide information (e.g., via a display device or the like) and/or receive input from a user of the sensor. The UI 62 may include, for example, a speaker to output an audible alarm and/or message when an event is detected by the sensor 60, such as an opening of a door or window. Alternatively, or in addition, the UI 62 may include a light to be activated when an event is detected by the sensor 60. The user interface may be relatively minimal, such as a limited-output display, or it may be a full-featured interface such as a touchscreen.

Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

FIG. 9 shows an example of a smart home environment as disclosed herein, which may be implemented over any suitable wired and/or wireless communication networks. One or more sensors 71, 72 may communicate via a local network 70, such as a Wi-Fi or other suitable network, with each other and/or with a controller 73. The controller 73 may include, for example, the hub computing device 100 shown in FIGS. 1-2. The sensors 71, 72 shown in FIG. 9 may represent the sensor 60 shown in FIG. 8 and discussed above, and/or the motion sensor 910, the active infrared sensor 912, and/or the photodiode devices 920, 925 shown in FIGS. 1-2 and discussed above. FIG. 9 may include the HVAC 75 described above in connection with FIGS. 1-2.

FIG. 9 shows an example of a smart home environment as disclosed herein, which may be implemented over any suitable wired and/or wireless communication networks. One or more sensors 71, 72 may communicate via a local network 70, such as a Wi-Fi or other suitable network, with each other and/or with a controller 73. The devices of the smart home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart home environment may include wireless system-on-chips to support the low-power, secure, stable, and/or scalable communications network 70.

The controller 73 shown in FIG. 9 that is communicatively coupled to the network 70 may be and/or include a processor. Alternatively, or in addition, the controller 73 may be a general- or special-purpose computer. The controller 73 may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors 71, 72 may communicate directly with a remote system 74. The remote system 74 may, for example, aggregate data from multiple locations, provide instruction, software updates, and/or aggregated data to a controller 73 and/or sensors 71, 72.

The sensor network shown in FIG. 9 may be an example of a smart home environment. The depicted smart home environment may include a structure, a house, office building, garage, mobile home, or the like. The devices of the smart home environment, such as the sensors 71, 72, the controller 73, and the network 70 may be integrated into a smart home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart home environment may include a plurality of rooms, separated at least partly from each other via walls. The walls can include interior walls or exterior walls. Each room can further include a floor and a ceiling. Devices of the smart home environment, such as the sensors 71, 72, may be mounted on, integrated with and/or supported by a wall, floor, or ceiling of the structure.

The smart home environment including the sensor network shown in FIG. 9 may include a plurality of devices, including intelligent, multi-sensing, network-connected devices that can integrate seamlessly with each other and/or with a central server or a cloud-computing system (e.g., controller 73 and/or remote system 74) to provide home-security and smart home features. The smart home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 9.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 9, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 9 and the controller 73 may control an alarm system to provide a visual and/or audible alarm to the user of the smart home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart home environment of the sensor network shown in FIG. 9 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 9. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart home environment). For example, one of the smart wall plugs may controls supply of power to a lamp (not shown).

In embodiments of the disclosed subject matter, a smart home environment may include one or more intelligent, multi-sensing, network-connected entry detectors (e.g., "smart entry detectors"). Such detectors may be or include one or more of the sensors 71, 72 shown in FIGS. 3A-3B. The illustrated smart entry detectors (e.g., sensors 71, 72) may be disposed at one or more windows, doors, and other entry points of the smart home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. According to the operating mode of the security system, the system may output an alarm and/or a notification message (e.g., to a user device, such as a smartphone, wearable computing device, personal computer, audible message via a speaker, or the like).

The smart home environment of the sensor network shown in FIG. 9 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart home environment). However, it should be appreciated that smart doorknobs can be provided on external and/or internal doors of the smart home environment.

The smart thermostats, the smart hazard detectors, the smart doorbells, the smart wall switches, the smart wall plugs, the smart entry detectors, the smart doorknobs, the keypads, and other devices of a smart home environment (e.g., as illustrated as sensors 71, 72 of FIG. 9 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, smart watch, wearable computing device, a tablet, radio frequency identification (RFID) tags, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart home environment using a network-connected computer or portable electronic device. In some examples, some or all of the users (e.g., individuals who live in the home) can register their mobile device and/or key FOBs with the smart home environment (e.g., with the controller 73). Such registration can be made at a central server (e.g., the controller 73 and/or the remote system 74) to authenticate the user and/or the electronic device as being associated with the smart home environment, and to provide permission to the user to use the electronic device to control the network-connected smart devices and the security system of the smart home environment. A user can use their registered electronic device to remotely control the network-connected smart devices and security system of the smart home environment, such as when the occupant is at work or on vacation. The user may also use their registered electronic device to control the network-connected smart devices when the user is located inside the smart home environment.

In some embodiments, the security system may change the mode of operation according to the location of the device (e.g., a smartphone, wearable computing device, or the like) of the registered user. For example, the system may determine, using GPS data from the user device, that the device is outside of a predetermined range from the home or building, and the system may correspondingly switch the operation mode to an away mode or vacation mode if no other occupants are in the home or building. In some embodiments, the system may transmit a message to the user's registered device (e.g., smartphone, wearable computing device, or the like) to notify the user of the change in operation mode. Alternatively, or in addition, the system may transmit a request to the user's device, so that the user may confirm or deny the request to change the operating mode of the security system.

Alternatively, or in addition to registering electronic devices, the smart home environment may make inferences about which individuals live in the home and are therefore users and which electronic devices are associated with those individuals. As such, the smart home environment may "learn" who is a user (e.g., an authorized user) and permit the electronic devices associated with those individuals to control the network-connected smart devices of the smart home environment (e.g., devices communicatively coupled to the network 70), in some embodiments including sensors used by or within the smart home environment. Various types of notices and other information may be provided to users via messages sent to one or more user electronic devices (e.g., device 75). For example, the messages can be sent via email, short message service (SMS), multimedia messaging service (MMS), unstructured supplementary service data (USSD), as well as any other type of messaging services and/or communication protocols.

In some embodiments, the security system and/or the smart home environment may learn (e.g., by aggregating data detected by the sensors over a period of time) the amount of exit time and/or exit patterns of a user. For example, the system may learn which doors of the home a user frequently exits from, what times the doors are used for exit, the patterns of movement in the house by the user prior to exit (e.g., so that the system may change the operating mode to a transition mode, before changing to an away mode when the user has left), the amount of time the user takes to exit the home, or the like. The system may learn to provide the user more time to exit the home if needed, so that an unwanted alarm is not output.

A smart home environment may include communication with devices outside of the smart home environment but within a proximate geographical range of the home. For example, the smart home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart home environment. For example, in the event, any of the network-connected smart devices, such as smart wall plugs located outdoors, detect movement at night time, the controller 73 and/or remote system 74 can activate the outdoor lighting system and/or other lights in the smart home environment.

The one or more sensors 71, 72 may be magnetic field sensors that detect a security event when a door and/or window of a building having the security system disclosed herein has been opened and/or compromised. In yet another example, the one or more sensors 71, 72 may be a smoke sensor and/or a carbon monoxide sensor that detect an environmental event when smoke is sensed and/or carbon monoxide is sensed.

More generally, the sensor 71, 72 may be any sensor capable of obtaining identifying information about a user and/or the environment in which the sensor is disposed, which can be used to determine whether the user is an authorized user by comparison to known information about the user, and to determine information about changes in the environment in which the sensor is disposed.

In embodiments of the disclosed subject matter shown in FIG. 9, the remote system 74 may be a law enforcement provider system, a home security provider system, a medical provider system, and/or a fire department provider system. When a security event and/or environmental event is detected by at least one of one sensors 71, 72, a message may be transmitted to the remote system 74. The content of the message may be according to the type of security event and/or environmental event detected by the sensors 71, 72. For example, if smoke is detected by one of the sensors 71, 72, the controller 73 may transmit a message to the remote system 74 associated with a fire department to provide assistance with a smoke and/or fire event (e.g., request fire department response to the smoke and/or fire event). Alternatively, the sensors 71, 72 may generate and transmit the message to the remote system 74. In another example, when one of the sensors 71, 72 detects a security event, such a window or door of a building being compromised, a message may be transmitted to the remote system 74 associated with local law enforcement to provide assistance with the security event (e.g., request a police department response to the security event).

The controller 73 and/or the remote system 74 may include a display to present an operational status message (e.g., a security event, an environmental event, an operational condition, or the like), according to information received from at least one or the sensors 71, 72. For example, the display of the controller 73 and/or remote system 74 may display the operational status message to a user while the user is away from the building having the security system disclosed herein. Alternatively, or in addition, the controller 73 may display the operational status message to a user when the user arrives at and/or departs (i.e., exits) from the building. For example, one or more sensors may identify and authenticate the user, and the security system may display the operational status message.

Figure 10:
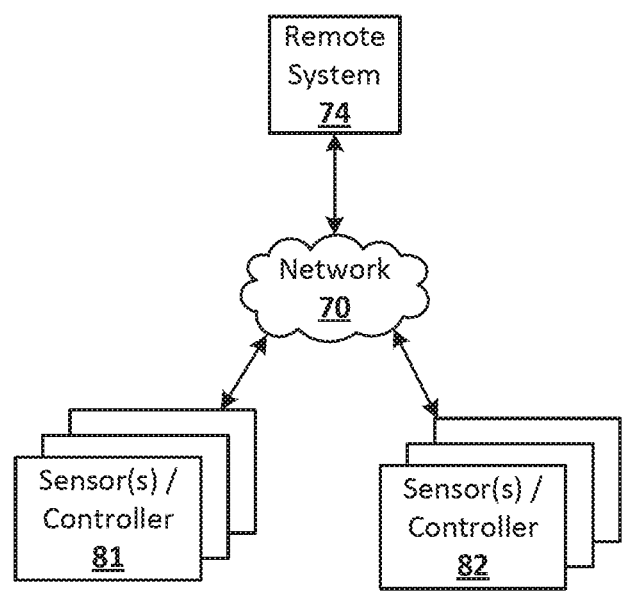
FIG. 10 shows a remote system to aggregate data from multiple locations having security systems according to an implementation of the disclosed subject matter.

In some configurations, as illustrated in FIG. 10, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 9 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., a user's current location, a location of the user's house or business, or the like), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 11:
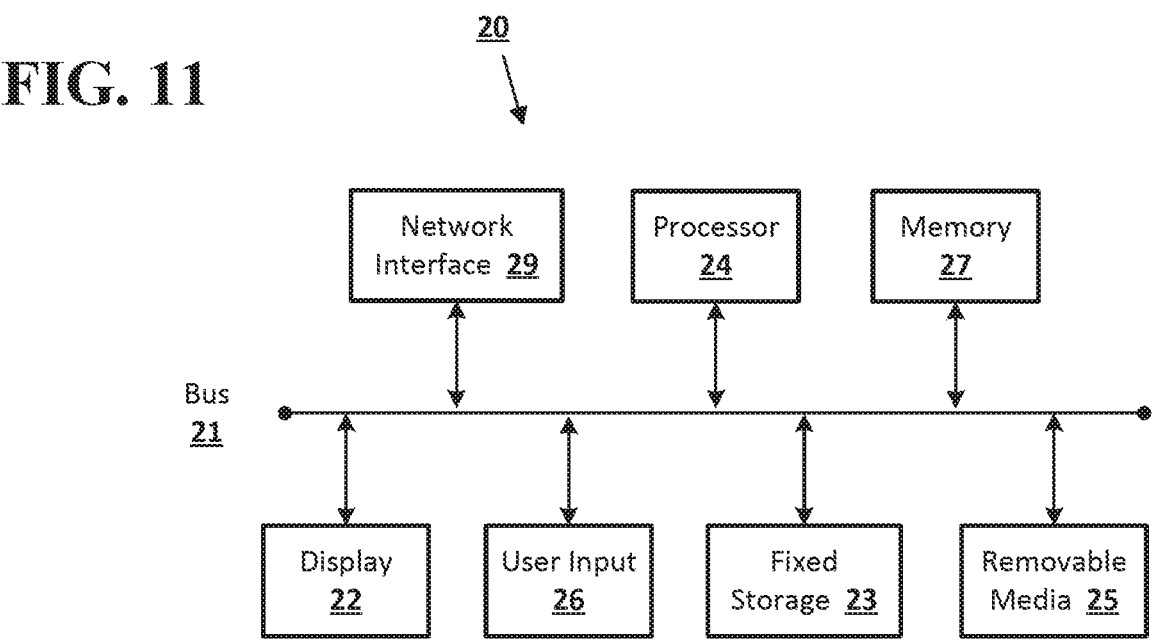
FIG. 11 shows an example computing device suitable for implementing embodiments of the presently disclosed subject matter.

Embodiments of the presently disclosed subject matter may be implemented in and used with a variety of computing devices. FIG. 11 is an example computing device 20 suitable for implementing embodiments of the presently disclosed subject matter. The computing device may be the computing device 20 illustrated in FIGS. 1-2 and discussed above. The device 20 may be used to implement a controller, a device including sensors as disclosed herein, or the like. Alternatively or in addition, the device 20 may be, for example, a desktop or laptop computer, or a mobile computing device such as a smart phone, smart watch, wearable computing device, tablet, key FOB, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen and/or lights (e.g., green, yellow, and red lights, such as light emitting diodes (LEDs) to provide the operational status of the security system to the user, as discussed above), a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide a communications link with the network 70, sensors 71, 72, controller 73, and/or the remote system 74 as illustrated in FIG. 9. The network interface 29 may provide such connection using any suitable technique and protocol as will be readily understood by one of skill in the art, including digital cellular telephone, radio frequency (RF), Wi-Fi, Bluetooth®, Bluetooth Low Energy (BTLE), near-field communications (NFC), and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   outputting infrared (IR) light from an IR light source of an active infrared (AIR) sensor;
   receiving reflected IR light from an object in a room with a light sensor;
   mapping, by the processor, features of the room based on the received reflected IR light to form a three dimensional map; and
   determining, with a processor coupled to the light sensor, whether the object in the room is a person and has moved based on the received reflected IR light and based on the formed three dimensional map.

2. The method of claim 1, further comprising:
   determining, by the processor, a security event based on an operating mode of a security system coupled to the processor and based on a determined movement of the object based on the received reflected IR light.

3. The method of claim 2, further comprising:
   transmitting a notification based on the operating mode of the security system and the determination that the object has moved.

4. The method of claim 2, further comprising:
   controlling, by the processor, an alarm device to output an alarm based on the operating mode of the security system and the determined movement of the object.

5. The method of claim 1, wherein the outputting infrared (IR) light from the IR light source comprises:
   forming a tripwire from the outputted light from the IR light source and the received reflected IR light; and
   determining whether the tripwire has been triggered by the person based on an interruption of the reflected IR light being received by the light sensor.

6. The method of claim 5, further comprising:
   determining, by the processor, a security event based on an operating mode of a security system coupled to the processor and based on the determined triggering of the tripwire.

7. The method of claim 5, further comprising:
   transmitting a notification based on the operating mode of the security system and the determined triggering of the tripwire.

8. The method of claim 5, further comprising:
   controlling, by the processor, an alarm device to output an alarm based on the operating mode of the security system and the determined triggering of the tripwire.

9. The method of claim 1, wherein the determining whether the object in a room has moved comprises:
   when the object is a gas burner on a stove based on the received reflected IR light, determining whether a flame is being emitted from the burner;
   determining, at the processor, whether the person has not been in the room for a predetermined period of time based on the received reflected IR light when it is determined that a flame is being emitted from the burner; and
   outputting, at the processor, a notification when the person is determined to not be in the room for the predetermined period of time and the flame is being emitted from the burner.

10. A system comprising:
    an IR light source of an active infrared (AIR) sensor to output infrared (IR) light;
    a light sensor to receive reflected IR light from an object in a room; and
    a processor, coupled to the light sensor, to map features of the room based on the received reflected IR light to form a three dimensional map, and determines whether the object in the room is a person and has moved i-s-based on the received reflected IR light and based on the formed three dimensional map.

11. The system of claim 10, wherein the processor determines a security event based on an operating mode of a security system that is coupled to the processor, and based on a determined movement of the object based on the received reflected IR light.

12. The system of claim 11, wherein the processor transmits a notification based on the operating mode of the security system and the determined movement of the object.

13. The system of claim 11, further comprising:
an alarm device coupled to the processor,
wherein the processor controls the alarm device to output an alarm based on the operating mode of the security system and the determined movement of the object.

14. The system of claim 10, wherein a tripwire is formed from the outputted light from the IR light source and the received reflected IR light, and
wherein the processor determines whether the tripwire has been triggered by the person based on an interruption of the reflected IR light being received by the light sensor.

15. The system of claim 14, wherein the processor determines a security event based on an operating mode of a security system coupled to the processor and based on the determined trigger of the tripwire.

16. The system of claim 14, wherein the processor transmits a notification based on the operating mode of the security system and the determined trigger of the tripwire.

17. The system of claim 14, further comprising:
an alarm device coupled to the processor,
wherein the processor controls the alarm device to output an alarm based on the operating mode and the determined trigger of the tripwire.

18. The system of claim 10, wherein when the object is determined to be a gas burner on a stove based on the received reflected IR light, the processor determines whether a flame is being emitted from the burner, determines whether the person has not been in the room for a predetermined period of time based on the received reflected IR light when it is determined that a flame is being emitted from the burner, and outputs a notification when the person is determined to not be in the room for the predetermined period of time and the flame is being emitted from the burner.

* * * * *